(12) United States Patent
Hartman et al.

(10) Patent No.: US 9,791,307 B2
(45) Date of Patent: Oct. 17, 2017

(54) SYSTEMS AND METHODS FOR DETECTING FLOW OF A FLUID

(71) Applicant: Alicat Scientific, Inc., Tucson, AZ (US)

(72) Inventors: Neil W. Hartman, Bowie, AZ (US); Colin A. Roberts, Tucson, AZ (US); Marcus A. Mitchell, Tucson, AZ (US)

(73) Assignee: Alicat Scientific, Inc., Tucson, AZ (US)

( * ) Notice: Subject to any disclaimer, the term of this patent is extended or adjusted under 35 U.S.C. 154(b) by 106 days.

(21) Appl. No.: 15/060,681

(22) Filed: Mar. 4, 2016

(65) Prior Publication Data

US 2016/0258797 A1    Sep. 8, 2016

Related U.S. Application Data

(60) Provisional application No. 62/129,242, filed on Mar. 6, 2015.

(51) Int. Cl.
| | | |
|---|---|---|
| *G01F 15/14* | (2006.01) | |
| *G01F 1/69* | (2006.01) | |
| *G01F 15/06* | (2006.01) | |
| *G01F 1/684* | (2006.01) | |
| *G01F 5/00* | (2006.01) | |

(52) U.S. Cl.
CPC ............ *G01F 15/14* (2013.01); *G01F 1/684* (2013.01); *G01F 1/69* (2013.01); *G01F 5/00* (2013.01); *G01F 15/06* (2013.01)

(58) Field of Classification Search
CPC . G01F 15/14; G01F 1/684; G01F 1/69; G01F 5/00; G01F 15/06
See application file for complete search history.

(56) References Cited

U.S. PATENT DOCUMENTS

| | | | |
|---|---|---|---|
| 4,100,801 A | 7/1978 | LeMay | |
| 4,487,062 A | 12/1984 | Olin et al. | |
| 4,648,270 A | 3/1987 | Johnson et al. | |
| 5,062,446 A | 11/1991 | Anderson | |
| 5,279,154 A * | 1/1994 | Vavra | G01F 1/6847 73/202.5 |

(Continued)

FOREIGN PATENT DOCUMENTS

WO    2012057886 A1    5/2012

OTHER PUBLICATIONS

International Search Report and Written Opinion dated Jun. 29, 2016 pertaining to International Application No. PCT/US2016/020805.

(Continued)

*Primary Examiner* — Jewel V Thompson
(74) *Attorney, Agent, or Firm* — Dinsmore & Shohl LLP

(57) ABSTRACT

Embodiments described herein include systems and methods for detecting flow of a fluid. One embodiment of a system includes a flow body, a thermal tube sensor housing, and a computing device. In some embodiments, the flow body includes an inlet for receiving the fluid and an outlet for expelling the fluid, the thermal tube sensor housing includes a sensor tube that includes a first connection portion and a second connection portion, and the sensor tube is configured with a cross position where a first portion of the sensor tube crosses paths with a second portion of the sensor tube, reducing a thermo-siphoning effect.

19 Claims, 6 Drawing Sheets

(56) References Cited

U.S. PATENT DOCUMENTS

| | | | |
|---|---|---|---|
| 6,125,695 A | 10/2000 | Alvesteffer et al. | |
| 6,318,171 B1* | 11/2001 | Suzuki | G01F 1/6845 |
| | | | 73/204.27 |
| 6,446,504 B1* | 9/2002 | Maginnis, Jr. | G01F 1/6847 |
| | | | 73/202.5 |
| 6,628,202 B2 | 9/2003 | McQueen et al. | |
| 6,637,264 B2 | 10/2003 | Loetters et al. | |
| 7,021,136 B2 | 4/2006 | Vincze et al. | |
| 7,054,767 B2 | 5/2006 | Eldridge | |
| 7,469,583 B2* | 12/2008 | Suzuki | G01F 1/6847 |
| | | | 73/204.25 |
| 7,971,480 B2* | 7/2011 | Smirnov | G01F 1/6842 |
| | | | 73/202.5 |
| 8,251,091 B2 | 8/2012 | Zolock et al. | |
| 8,342,018 B2 | 1/2013 | Huang et al. | |
| 9,267,907 B2* | 2/2016 | Probst | G01F 1/6845 |
| 2003/0115951 A1* | 6/2003 | Ambrosina | G01F 1/684 |
| | | | 73/202.5 |

OTHER PUBLICATIONS

Lawrence W. Eget et al., "A Thermal Mass Flow Sensor Using a Constant Differential Temperature Above the Ambient Gas Temperature", Teledyne Instruments, Proceedings of FEDSM'98, 1998 ASME Fluids Engineering Division Summery Meeting, FEDSM'98-5292, Jun. 21-25, 1998.

Sashi Kumar et al., "Understanding the Compatibility of Thermal Mass Flow Meter with Various Process Gases", Chemical Engineering & Process Technology, Computational Fluid Dynamics, ISSN: 2157-7048 JCEPT, 2011.

Thomas O. Maginnis, "Progress in the Theory of the Laminar Tube Thermal Flow Sensor", CAL LAB: The International Journal of Metrology, pp. 24-39, Jan.-Mar. 2014.

\* cited by examiner

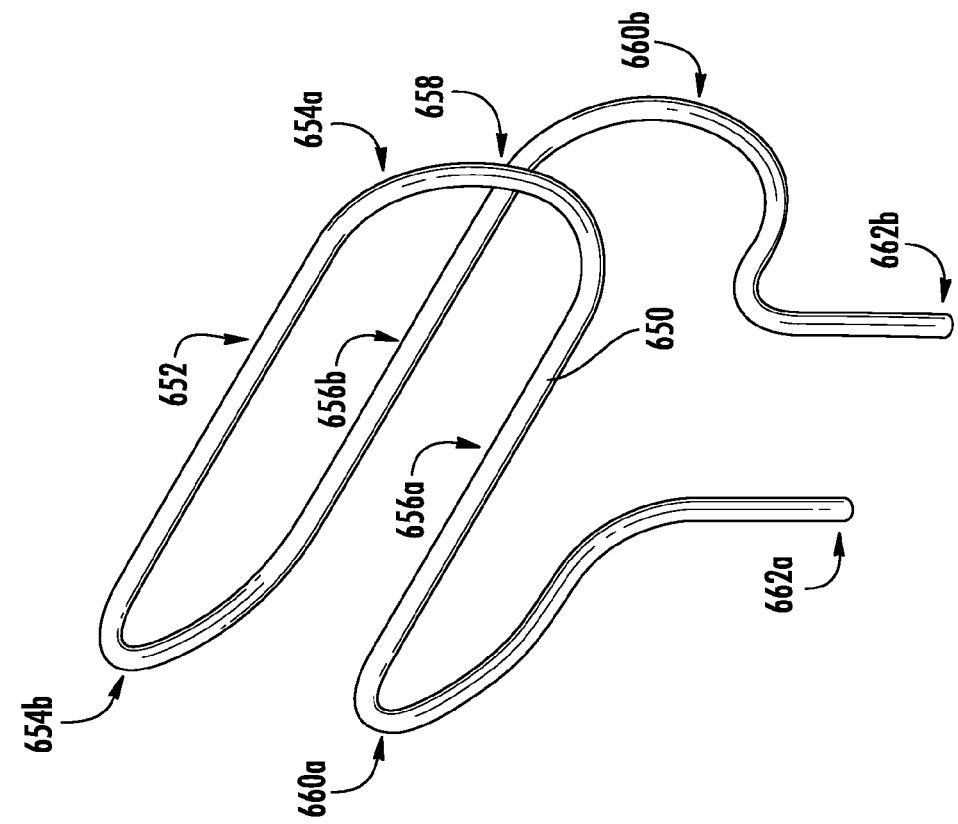
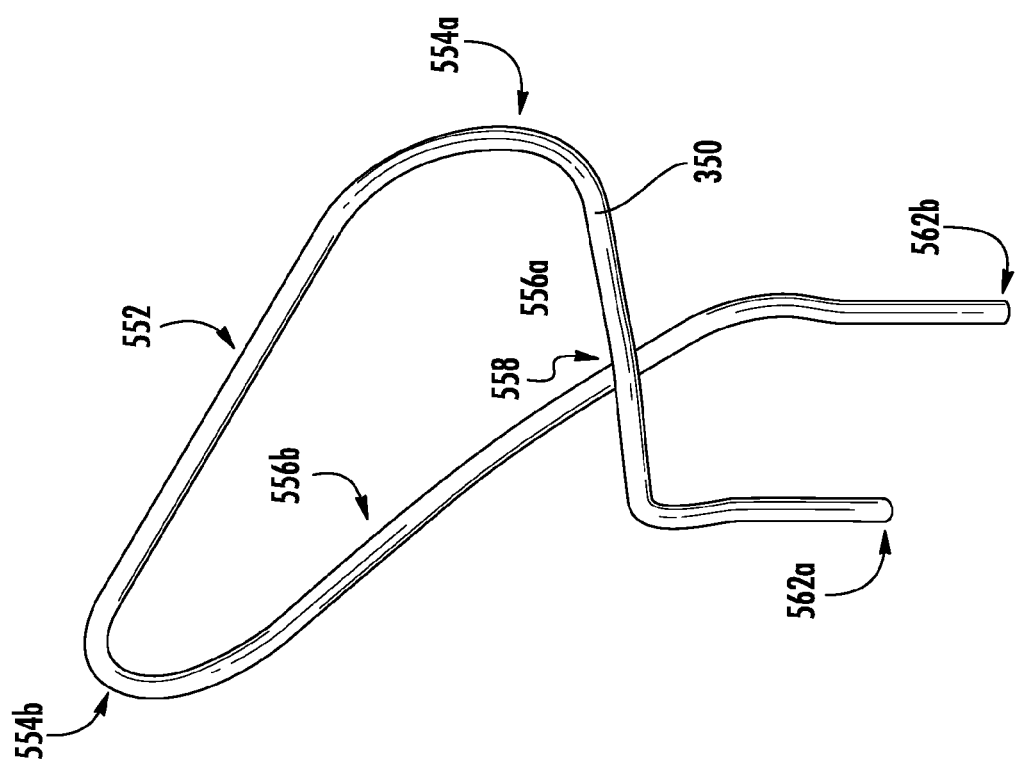

SYSTEMS AND METHODS FOR DETECTING FLOW OF A FLUID

CROSS REFERENCE

This application claims the benefit of U.S. Provisional Application Ser. No. 62/129,242, filed Mar. 6, 2015. This application is also related to a co-owned U.S. Non-Provisional application entitled Systems and Methods for Thermal Mass Flow Insulation, which is filed on the same day as the present application and is incorporated herein by reference in its entirety.

TECHNICAL FIELD

Embodiments described herein are directed to systems and methods for thermal mass flow sensing and control and, specifically to embodiments for determining data related to flow rate of a fluid.

BACKGROUND

Mass flow meters are commonly used to measure fluid flow by sensing and quantifying selected physical parameters of the flow. Mass flow meters can also be used as a component of fluid flow controllers. Some current flow meters sense flow by measuring a change in temperature of a flowing fluid when a fixed amount of thermal energy is applied to the fluid. While these current flow meters may provide some data related to flow rate and other data, these embodiments often lack accuracy that is typically demanded in the field.

SUMMARY

Embodiments described herein include systems and methods for detecting flow of a fluid. One embodiment of a system includes a flow body, a thermal tube sensor housing, and a computing device. In some embodiments, the flow body includes an inlet for receiving the fluid and an outlet for expelling the fluid, the thermal tube sensor housing includes a sensor tube that includes a first connection portion and a second connection portion, and the sensor tube is configured with a cross position where a first portion of the sensor tube crosses paths with a second portion of the sensor tube, reducing a thermo-siphoning effect.

Another embodiment for detecting flow of a fluid includes a flow body, a thermal tube sensor housing, and a computing device. The flow body may include an inlet for receiving the fluid and an outlet for expelling the fluid. The thermal tube sensor housing may include a sensor tube that comprises a first connection portion, and a second connection portion. In some embodiments, the sensor tube is configured with a cross position, where the cross position includes a first portion of the sensor tube crossing paths with a second portion of the sensor tube, thereby reducing a thermo-siphoning effect. In some embodiments, the thermal tube sensor housing comprises a first inboard temperature sensor, a second inboard temperature sensor, a first outboard temperature sensor, a second outboard temperature sensor, and a heater that are coupled to the sensor tube. In still some embodiments, a flow rate is determined based on a change in temperature of the fluid detected by the first inboard temperature sensor, the second inboard temperature sensor, the first outboard temperature sensor, and the second outboard temperature sensor. Additionally, the data related to the flow rate may be output for display.

Another embodiment may include a thermal tube sensor housing for detecting flow of a fluid that includes a sensor tube, a first sensor bridge, a second sensor bridge, and a heater. In these embodiments, the first sensor bridge may include a first inboard temperature sensor and a second inboard temperature sensor. Additionally, the second sensor bridge may include a first outboard temperature sensor and a second outboard temperature sensor. In some embodiments, the first sensor bridge, the second sensor bridge, and the heater are coupled to the sensor tube. Similarly, the sensor tube may be configured with a cross position, where the cross position includes a first portion of the sensor tube crossing paths with a second portion of the sensor tube, thereby reducing a thermo-siphoning effect when the heater imparts thermal energy into the sensor tube. Additionally, a flow rate may be determined based on a change in temperature of the fluid detected by the first inboard temperature sensor, the second inboard temperature sensor, the first outboard temperature sensor, and the second outboard temperature sensor. Further, the data related to the flow rate may be output for display.

BRIEF DESCRIPTION

This description of specific embodiments of the present disclosure can be best understood when read in conjunction with the following drawings, where like structure is indicated with like reference numerals and in which:

FIG. 5 depicts a perspective view of a sensor tube, according to one embodiment of the present disclosure;

FIG. 6 depicts a perspective view of another configuration of a sensor tube, according to one embodiment of the present disclosure.

DETAILED DESCRIPTION

The present disclosure relates to mass flow sensing and control and, more particularly, to flow meters that sense temperature changes in flowing fluid using an improved sensor design that avoids thermo-siphon effects and is insulated with a material that prevents external convective heat transfer. The present disclosure further relates to flow meters that use a resistive heater flanked by passive temperature sensors, incorporates thermistors to improve sensor responsiveness to small flow rate changes, and precisely monitors an average temperature of a sensor bridge to improve the responsiveness to flow rate changes.

Specifically, many mass flow meters utilize a sensor tube that is typically "U" shaped. A fluid is passed through this "U" shaped sensor tube and heat is applied to the tube for detecting the mass flow rate of the fluid. While such current solutions may provide some level of accuracy for mass flow rate, oftentimes these current solutions cause a thermo-siphoning effect, where the fluid is not heated evenly and the heated portion of the fluid rises to a different area of the sensor tube. This often causes an unintended flow reading by a flow device because the fluid is moving counter to the actual mass flow rate. Embodiments described herein significantly reduce and/or eliminate thermo-siphoning effects, thus providing enhanced accuracy for the mass flow rate determination and other measurements and calculations described herein.

Additionally, embodiments described herein utilize an insulator that includes insulating material for preventing undesirable thermal leakage that occurs when applying a heater to thermally conductive portions of the flow meter. The insulating material may include vacuum beads, a binder, and/or other materials for further enhancing accuracy of the flow meter, as described in more detail below.

Figure 1:
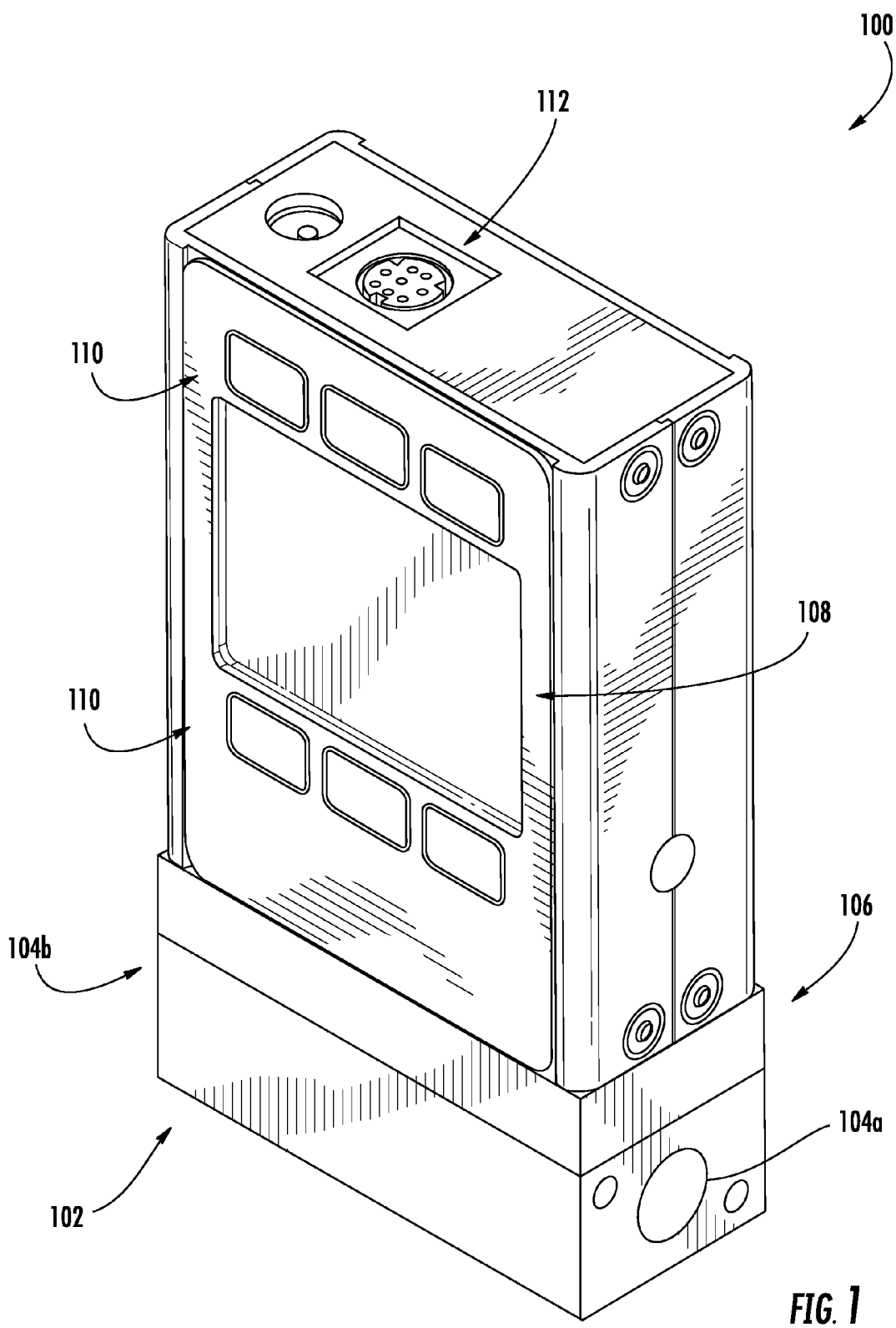
FIG. 1 depicts a perspective view of a mass flow meter, according to one embodiment of the present disclosure.

Referring now to the drawings, FIG. 1 depicts a perspective view of a flow meter 100, according to one embodiment of the present disclosure. As illustrated, the flow meter 100 includes a flow body 102, which includes an inlet 104a and an outlet 104b. The inlet 104a is configured for receiving a fluid and the outlet 104b is configured for expelling the fluid. A sensor adaptor 106 is also included and coupled to the flow body 102. The flow meter 100 may also include a display device 108 and a user option 110 (or plurality of user options) for providing data and user input related to flow of a fluid that is detected by the flow meter 100. As an example, some embodiments may be configured to provide mass flow rate, volumetric flow rate, pressure, temperature, and/or other data. The flow meter 100 may also include an input and/or output port 112 for providing output to a user or external device and/or for receiving input from a user or external device.

Figure 2:
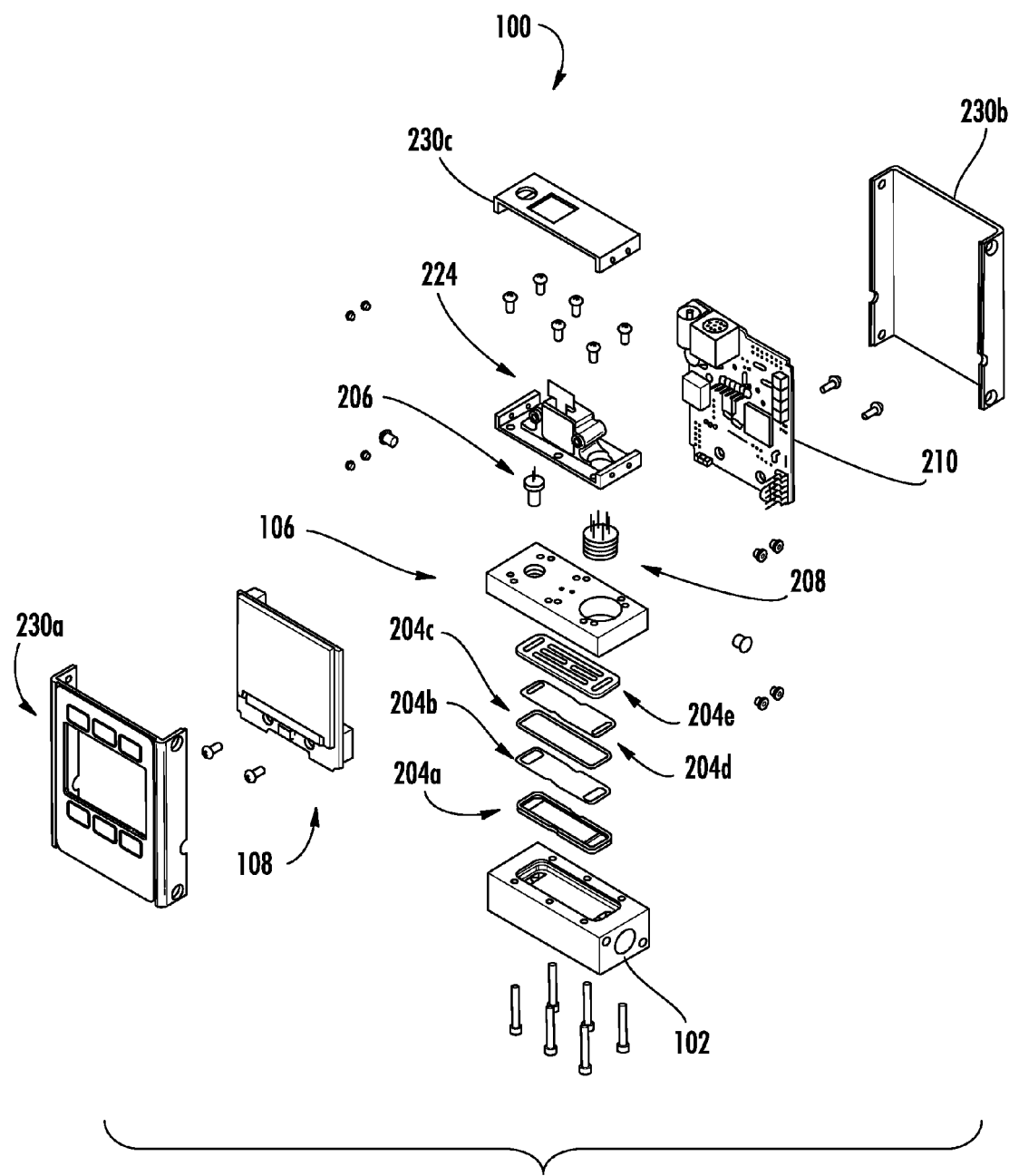
FIG. 2 depicts an exploded view of a mass flow meter and its various components, according to one embodiment of the present disclosure.

FIG. 2 depicts an exploded view of a flow meter 100, according to one embodiment of the present disclosure. As illustrated, the flow meter 100 may include the flow body 102, which may be coupled to a flow interface 204a, high flow plate 204b, a flow element 204c, a top plate 204d, and a flow gasket 204e. The flow meter 100 may also include a temperature sensor 206 for detecting temperature of a fluid and/or environment. A pressure sensor 208 is also provided and may be configured for detecting pressure of the fluid and/or environment. With this information from the temperature sensor 206 and/or pressure sensor 208, as well as the mass flow that is determined (and described in more detail), volumetric flow may be determined.

A printed circuit board 210 is also included in the embodiment of FIG. 2 and may include a processor, memory component, and other hardware for providing the functionality provided herein, such as making these calculations. The memory component may store logic that, when executed by the processor, causes performance of the functionality described herein. It should be understood that while the printed circuit board 210 is depicted in FIG. 2, some embodiments may utilize any computing device, hardware, software, and/or firmware for providing the functionality described herein.

Coupled to the temperature sensor 206 and the pressure sensor 208 is a thermal tube sensor housing 224, which may include a housing cavity for holding sensing components described in more detail below. The flow meter 100 may also include an exterior portion, which may include a front plate 230a, a back plate 230b, and an upper plate 230c. The exterior portion may enclose the internal components described in FIG. 2 and may thus may create a water-tight and/or air-tight seal to prevent corrosion of the internal components.

Figure 3:
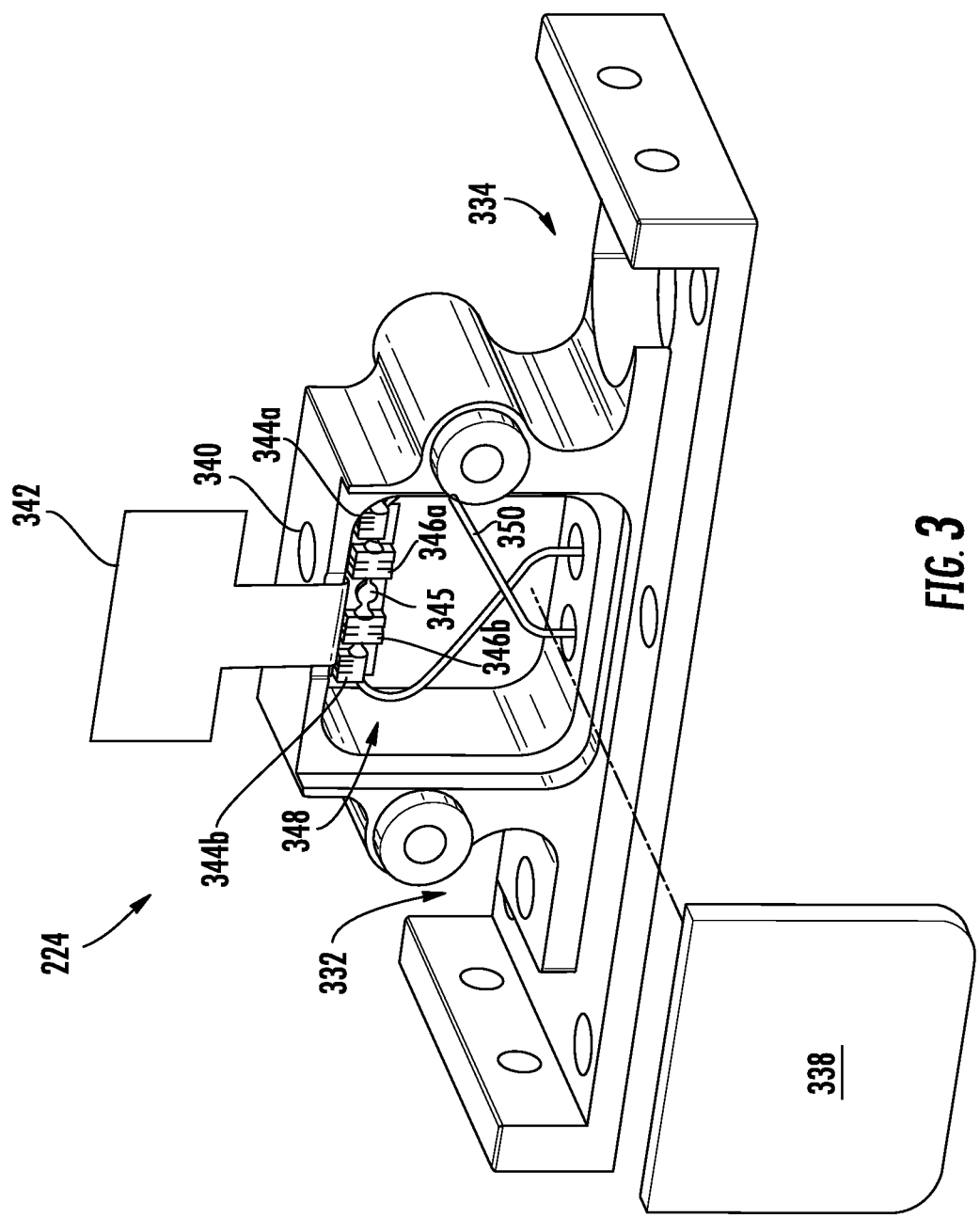
FIG. 3 depicts a perspective view of a thermal tube sensor housing of a mass flow meter, according to one embodiment of the present disclosure.

FIG. 3 depicts a perspective view of a thermal tube sensor housing 224 of a flow meter 100, according to one embodiment of the present disclosure. As illustrated, the thermal tube sensor housing 224 may include a plurality of bores 332, 334 for receiving the temperature sensor 206 and the pressure sensor 208, respectively. Also provided in the thermal tube sensor housing 224 are bores 336a, 336b, which are configured to receive a sensor tube 350, as well as to connect the housing cavity 348 with the flow body 102 (FIG. 2). As discussed in more detail below, the bores 336a, 336b may couple to a bypass portion, a feed portion, and a return portion of the flow body 102 for directing a fluid through the sensor tube 350.

The housing cavity 348 may be sized and shaped to contain the sensor tube 350, a first bridge circuit, a second bridge circuit, a heater 345, and an insulation material, as described in greater detail herein. The housing cavity 348 may be accessible via a cover plate 338. The cover plate 338 may be removable to access the various components inside the housing cavity 348, such as, for example, to assemble the components prior to filling the housing cavity 348 with an insulator, as described in greater detail herein. The housing cavity 348 may additionally contain a sealable opening 340. The sealable opening 340 may be used to inject a material, such as, for example an insulator into the housing cavity 348 after the cover plate 338 is installed.

As discussed above, the embodiment of FIG. 3 may include a first sensor bridge, which may includes outboard temperature sensors 344a, 344b, a second sensor bridge that includes inboard temperature sensors 346a, 346b, as well as a heater 345 that provides thermal energy to the fluid within the sensor tube 350. The outboard temperature sensors 344a, 344b and the inboard temperature sensors 346a, 346b may include one or more negative and/or positive temperature coefficient thermistors that change resistance, in response to changing temperature.

As also illustrated in FIG. 3, the sensor tube 350 may pass near inboard temperature sensors 346a, 346b. In addition, a plurality of outboard temperature sensors 344a, 344b may be located adjacent to the inboard temperature sensors 346a, 346b such that the outboard temperature sensors 344a, 344b flank the inboard temperature sensors 346a, 346b. The plurality of outboard temperature sensors 344a, 344b may be configured to measure the temperature rise of the fluid inside the sensor tube 350 as the fluid passes through an area of the sensor tube 350 heated by the heater 345 and its passage through the area. An observed rise in temperature due to heating by the heater 345 (which may be configured as a central resistive heater or other type of heat generating device) may provide a measure of the fluid's flow rate.

It should be understood that the first sensor bridge, the second sensor bridge, and/or the heater 345 may be part of the printed circuit board 210 (which may be mounted on mounting plate 342), part of another circuit board and/or coupled to a circuit board. Accordingly, some embodiments of the printed circuit board 210 may be configured to extend from the housing cavity 348 such that when the cover plate 338 is installed, at least a portion of the printed circuit board 210 remains outside of the housing cavity 348. Such an arrangement may be achieved, for example, by using a flexible circuit material for the printed circuit board 210.

It should also be understood the various components inside the housing cavity 348 may be mechanically supported or otherwise surrounded with an insulator, which may include an insulating material. The insulator may generally prevent external convective heat transfer to the various thermally conductive components inside the housing cavity 348. As may generally be recognized in the art, such external convective heat transfer can have a detrimental effect on the flow measurement accuracy of the sensing circuitry and/or the sensor tube 350 in sensing flow.

In one embodiment, the insulator includes thermal plascrete, which comprises a binder material and a plurality of beads, and may have a density on the order of about 0.5 g/cm$^3$. The insulating material may also optionally be coated with an adhesive, adhesive film, and/or compacted. The insulating material may generally be placed into the housing cavity 348 via the sealable opening 340.

The plurality of beads in the insulating material may be affixed together, such as via an ultrasonic welding process and/or a sintering process. Such processes may generally be any ultrasonic welding and/or sintering process now known or later developed. Depending on the embodiment, the beads may be a hollow material, such as, for example, glass or ceramic beads having a central void under vacuum. In one embodiment, the central void is at a pressure of about $1 \times 10^{-8}$ Torr. Such a pressure is merely illustrative, and those having ordinary skill in the art will recognize other pressures that may be used. In some embodiments, at least a portion of the beads may be a non-hollow, pearlite material, such as, for example, expanded clay.

The binder material may include a low viscosity binder, particularly a low viscosity binder that has been hardened by chemical reaction, evaporation, and/or pyrolysis. In some embodiments, the binder material may be combined at between 5 and 95 percent of the total mixture weight with the beads and cured. Other examples of a binder material may include one or more adhesives, such as, for example, an epoxy diluted with a solvent (such as, for example, ethanol, acetone, or methyl ethyl ketone). Such resultant binder materials may be lower in strength and density than some materials, but may be suitable for use as the insulating material in some embodiments.

Additional examples of a binder material may include an inorganic binder, such as, for example, sodium silicate or the like. In some embodiments, the binder material may be a phenolic binder. Such a binder material may be particularly suitable when the environment in which the binder material is located is recognized as a very high temperature. A phenolic binder material may be subjected to a pyrolysis process to convert the phenol (or a similar organic material) to carbon. The phenolic binder material may be subjected to repeated saturation and pyrolysis processes to increase the density and strength of the insulating material, though such processes may also increase the thermal conductivity of the insulating material. However, the resultant binder material may have a significantly lower thermal conductivity than generally recognized carbon-carbon composite materials.

The insulating material may further include one or more reinforcing materials. Particularly, the reinforcing material may include a fibrous reinforcement material. Illustrative reinforcing materials may include organic reinforcement materials such as an aramid and/or inorganic reinforcement material such as glass or carbon fiber.

In some embodiments, the housing cavity 348 may be insulated with a high molecular weight gas, particularly a high molecular weight gas that is generally recognized as being suitable for thermal insulation. Illustrative high molecular weight gasses may include, but are not limited to, xenon, krypton, and combinations thereof. The high molecular weight gas may be injected into the housing cavity 348 via the sealable opening 145 and may be combined with any of the aforementioned insulating beads.

Figure 4:
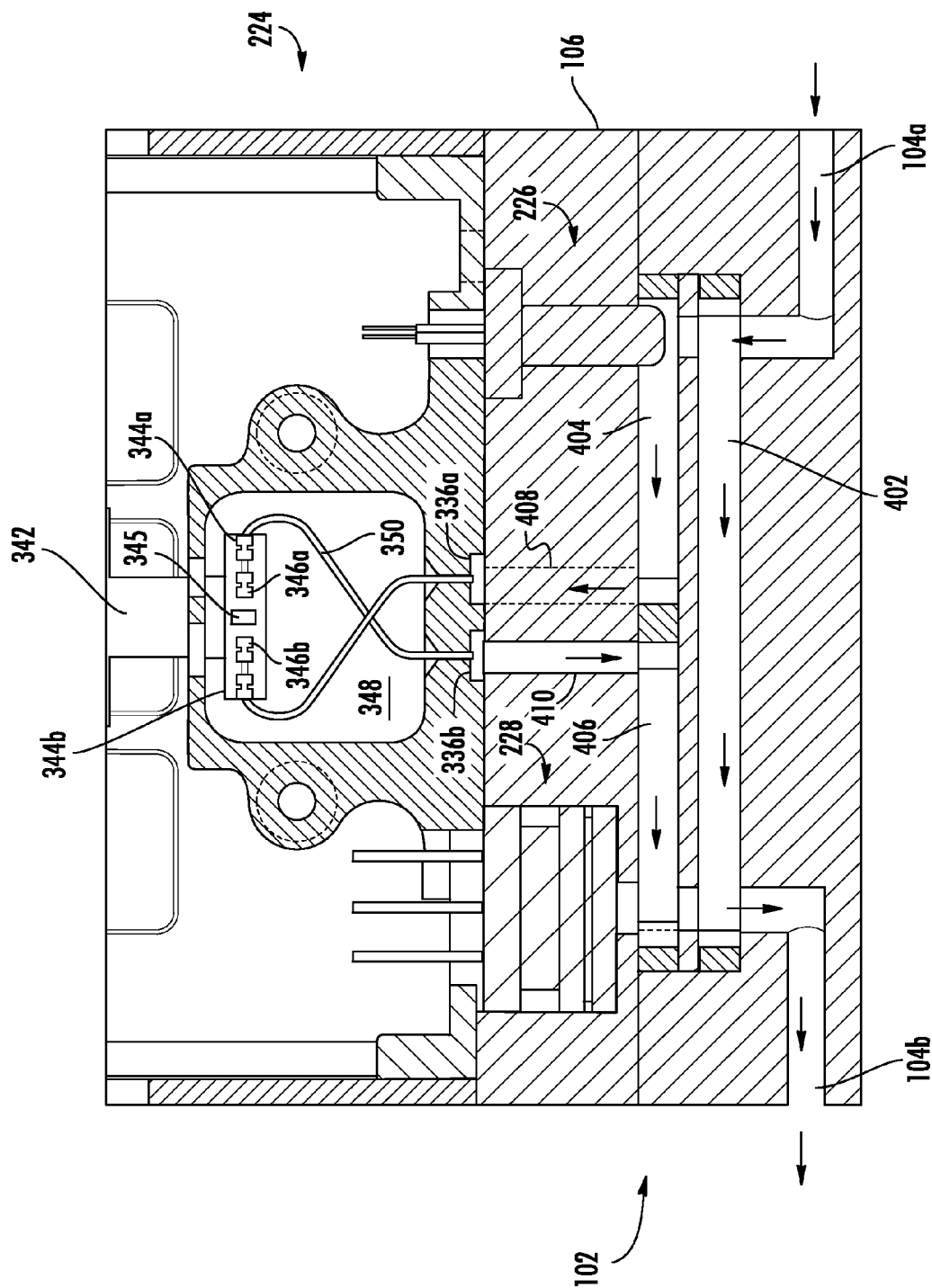
FIG. 4 depicts a side view of a thermal tube sensor housing, a flow body, and sensor adapter, according to one embodiment of the present disclosure.

FIG. 4 depicts a side view of a thermal tube sensor housing 224, a flow body 102, and sensor adaptor 106, according to one embodiment of the present disclosure. As illustrated, the flow body 102 may include the inlet 104a and the outlet 104b. Also included in the flow body 102 are a bypass section 402 and a feed section 404 and a return section 406. The bypass section 402 may receive at least a portion of the fluid, which is then directed to the outlet 104b. The feed section 404 is also coupled to the inlet 104a, as well to the sensor adaptor 106. The feed section thus directs the fluid to a supply passage 408 of the sensor adaptor 106, which is coupled to the thermal tube sensor housing 224 via the sensor tube 350. The fluid may then exit the thermal tube sensor housing 224 via a return passage 410 of the sensor adaptor 106 and then to the return section 406, and out of the flow meter 100 via the outlet 104b.

Accordingly, a fluid may enter the inlet 104a and may flow into the bypass section 402, as well as the feed section 404. The fluid received by the feed section 404 is directed to the sensor tube 350 via the supply passage. The fluid is then exposed to the first outboard temperature sensor 344a. The first outboard temperature sensor 344a detects the temperature of the fluid at a first time. The fluid is then exposed to a first inboard temperature sensor 346a, which detects the temperature of the fluid, at a second time. The fluid is exposed to the heater 345, which provides thermal energy to the fluid. The fluid is then exposed to the second inboard temperature sensor 346b, which detects the temperature (after being exposed to the heater 345) at a third time. The fluid is exposed to the second outboard temperature sensor 344b, which detects the temperature of the fluid at a fourth time. The fluid is then returned to the flow body 102 via the return section 406 and the return passage 410, which is then output through the outlet 104b.

Accordingly, the electrical signals caused by the temperature differential seen between the outboard temperature sensors 344a, 344b will be slower to respond to flow rate changes than those signals from the more centrally located inboard temperature sensors 346a, 346b. The time lag noted between the signals from these two sets of sensors may be utilized to infer the time lag between the signal from the centrally located inboard temperature sensors 346a, 346b and the actual fluid flow rate traversing sensor tube 350.

Specifically, the mass fluid flow may be measured by detecting a change in temperature of the flowing fluid passing through a sensor tube 350. The sensor tube 350 may be at least partially covered with temperature-sensitive resistance coils that are part of one or more of the sensor bridges. When a current is passed through the coils, the coils heat the sensor tube 350 and the fluid passing therein. The heated fluid causes the sensor bridge to become unbalanced, generating a signal that is directly proportional to the mass flow rate of the fluid passing there through.

Accordingly, embodiments described herein may detect a mass flow rate by detecting a temperature change of the fluid, as the fluid crosses the outboard temperature sensors 344a, 344b, the inboard temperature sensors 346a, 346b, and the heater 345. As the fluid reaches the first outboard temperature sensor 344a a temperature is detected. Similarly, the temperature of the fluid is detected when the fluid crosses the first inboard temperature sensor 346a. The fluid is then heated by the heater 345. As the fluid passes the second inboard temperature sensor 346b, the temperature is detected. As the fluid passes the second outboard temperature sensor 344b, the temperature is again detected. The computing elements on the printed circuit board 210 may then calculate the mass flow rate by determining the temperature change of the fluid versus the temperature difference between the temperature at the inboard temperature sensors 346a, 346b and the outboard temperature sensors 344a, 344b. Because the volumetric flow rate is calculated from the mass flow rate with respect to temperature and pressure, data from the temperature sensor 206 and the pressure sensor 208 may be utilized for this calculation.

It should also be understood that while the embodiment of FIG. 4 depicts the inlet 104a as receiving fluid from the environment and the outlet 104b as expelling the fluid to the environment, this is merely an example. Embodiments described herein may be configured to receive fluid via either the inlet 104a or the outlet 104b. If a fluid is received via the outlet 104b, values and calculations may encounter negative values, which indicate that the flow is opposite to the norm. Some embodiments may take the absolute value of such a negative value and/or provide other indication of the direction of fluid flow.

FIG. 5 depicts a perspective view of a sensor tube 350, according to one embodiment of the present disclosure. The sensor tube 350 may generally be configured to prevent a thermo-siphoning effect. As discussed above, the thermo-siphoning effect may occur because as the fluid is heated, the heated particles may move within the sensor tube 350, which may cause an incorrect mass flow reading. Thus, the configuration of the sensor tube 350 FIG. 5 may reduce and/or remove the thermo-siphoning effect present in many current solutions.

Specifically, the sensor tube 350 may incorporate one or more crossover configurations of a first portion of the sensor tube 350 and a second portion of the sensor tube 350. As illustrated, the crossover configuration of FIG. 5 includes an upper straight portion 552, which in the embodiment of FIG. 4 is coupled to the inboard temperature sensors 346a, 346b, the outboard temperature sensors 344a, 344b, and the heater 345. The sensor tube 350 may also include a first curved portion 554a and a second curved portion 554b, which are coupled to a first angled portion 556a and a second angled portion 556b, respectively. The first curved portion 554a and a second curved portion 554b embody substantially curved configurations (which may be mirrored configurations) that maintain the integrity of the sensor tube 350 (e.g., do not "pinch" or otherwise substantially reduce fluid flow in the sensor tube 350). The first curved portion 554a and a second curved portion 554b create a substantially acute angle between the upper straight portion 552 and the first angled portion 556a and the second angled portion 556b.

Thus, the first angled portion 556a and the second angled portion 556b cross paths at cross position 558. While the first angled portion 556a and the second angled portion 556b are not in physical contact in the sensor tube 350 of FIG. 5, this is just an example. In some embodiments, the cross position 558 may be configured such that the various portions of the sensor tube 350 are in physical contact. The sensor tube 350 also includes a first connection portion 562a and a second connection portion 562b, which are in fluid communication with the flow body 102, as depicted in FIG. 4.

As discussed above, the flow meter 100 may be configured to heat the fluid in the sensor tube 350, which may cause internal convective flow of the fluid. Thus in many current solutions, this results in an erroneous flow indication and/or other undesirable thermo-siphoning effects. By introducing the crossover configuration in the sensor tube 350, thermo-siphoning effects resulting from internal convective circulation are significantly reduced or eliminated.

FIG. 6 depicts a perspective view of another configuration of a sensor tube 650, according to one embodiment of the present disclosure. Similar to the embodiment of FIG. 5, FIG. 6 depicts a first portion of the sensor tube 650 and a second portion of the sensor tube 650 crossing at a cross position 658. As illustrated, the sensor tube 650 includes an upper straight portion 652, which is coupled to a first curved portion 654a and a second curved portion 654b. The first curved portion 654a is coupled to a first middle straight portion 656a, while the second curved portion 654b is coupled to a second middle straight portion 656b. As also illustrated, the first curved portion 654a crosses the second middle straight portion 656b creating a cross position 658. Also provided in the sensor tube 650 are a third curved portion 660a and a fourth curved portion 660b, which are coupled to a first connection portion 662a and a second connection portion 662b.

It should be understood that the embodiments of FIG. 6 illustrate a different configuration of the sensor tube 650, while maintaining an upper straight portion 652 and a cross position 658. While the upper straight portion 652 may not be straight in every embodiment, positions on the sensor tube 650 may be provided for connecting the inboard temperature sensors 346a, 346b, the outboard temperature sensors 344a, 344b, and the heater 345. Additionally, one or more cross positions may be provided to reduce and/or eliminate any undesirable thermo-siphoning effects. Similarly, other configurations are contemplated, which may be based on space available in the housing cavity 348 (FIG. 3).

Figure 7:
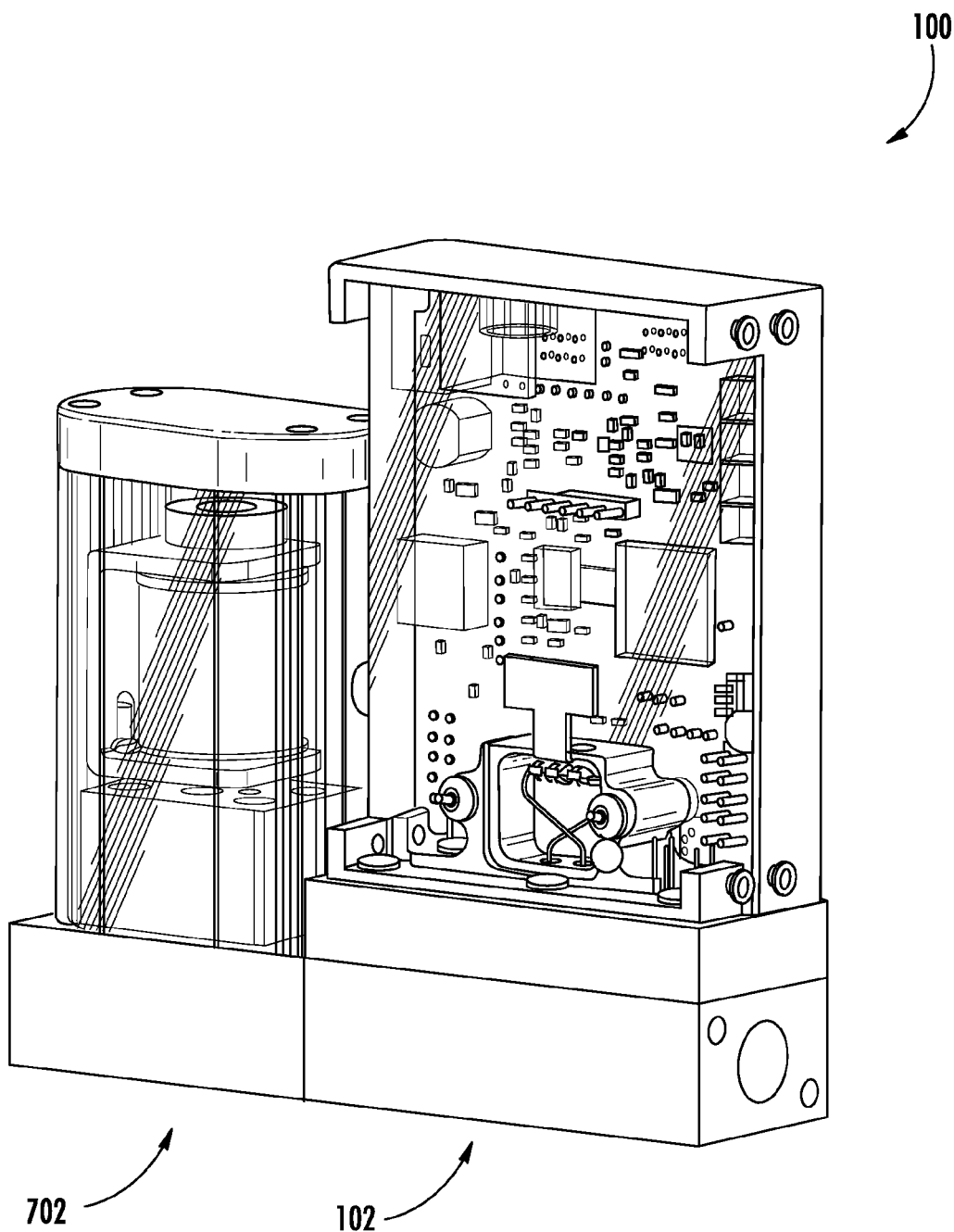
FIG. 7 depicts a side perspective view of a mass flow meter with a proportional control valve, according to one embodiment of the present disclosure.

FIG. 7 depicts a side perspective view of a flow meter 100 with a proportional control valve 702, according to one embodiment of the present disclosure. As illustrated, the flow meter 100 may couple to the flow body 102 to regulate flow that is received by the flow meter 100. As an example, the proportional control valve 702 may include an input port and an output port that may be opened and closed (fully or partially) to regulate this fluid flow. Based on input from the user and/or commands provided by the printed circuit board 210 (FIG. 2), the proportional control valve 702 may dictate the amount of fluid that is received by the flow meter 100. While this depiction illustrates the presence of a proportional control valve connected to the outlet port 104b, some embodiments may be envisioned where said proportional control valve would be placed at the inlet port 104a.

As an example, a desired mass flow rate may be determined. This determination may be made based on user input and/or a determination made by the printed circuit board 210. Regardless, if the flow meter 100 measures a mass flow rate that is different than the desired mass flow rate (over a predetermined threshold or tolerance), the proportional control valve 702 may modify the flow rate of the fluid entering or exiting the flow meter 100. Additionally, some embodiments may be configured to hold constant mass flow rate, volumetric flow rate, and/or pressure via the proportional control valve 702 and may report on the remaining variable values. As an example, the embodiment of FIG. 7 may be configured to hold constant the volumetric flow rate (which includes fixing mass flow rate, temperature, and/or pressure), and may then provide output data related to temperature, pressure, and/or mass flow rate. Other variations are also contemplated.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Therefore, at least the following is claimed:

1. A system for detecting flow of a fluid comprising a flow body, a thermal tube sensor housing, and a computing device, wherein:
   the flow body comprises an inlet for receiving the fluid and an outlet for expelling the fluid;
   the thermal tube sensor housing comprises a sensor tube that comprises a first connection portion and a second connection portion;
   the sensor tube is configured with a cross position where a first portion of the sensor tube crosses paths with a second portion of the sensor tube, reducing a thermo-siphoning effect;
   the thermal tube sensor housing comprises a first inboard temperature sensor, a first outboard sensor, a second inboard temperature sensor, a second outboard sensor, and a heater that are coupled to the sensor tube;
   the fluid flows from the first outboard sensor to the first inboard sensor, to the heater, to the second inboard sensor, and to the second outboard sensor;
   the thermal tube sensor housing is coupled to the flow body by the first connection portion and the second connection portion, such that the fluid received by the inlet is communicated to the sensor tube at the first connection portion and is returned to the flow body by the second connection portion for expelling by the outlet of the flow body;
   a flow rate is determined based on a change in temperature of the fluid detected by the first outboard sensor, first inboard temperature sensor, the second inboard temperature sensor, and the second outboard sensor; and
   data related to the flow rate is output for display.

2. The system of claim 1, wherein the flow rate includes at least one of the following: a mass flow rate and a volumetric flow rate.

3. The system of claim 1, further comprising a temperature sensor for detecting temperature and a pressure sensor for detecting pressure, wherein a reading from the temperature sensor and a reading from the pressure sensor are utilized by the computing device to calculate volumetric flow rate.

4. The system of claim 1, further comprising a proportional control valve, wherein the proportional control valve regulates an amount of fluid that enters the inlet.

5. The system of claim 4, further comprising a user option for holding constant at least one of the following: mass flow rate, temperature, and pressure.

6. The system of claim 1, wherein the first inboard temperature sensor and the second inboard temperature sensor are part of a bridge circuit for detecting the flow rate of the fluid.

7. The system of claim 1, wherein the flow body includes a bypass section, a feed section, and a return section, wherein the bypass section directs the fluid from the inlet to the outlet, wherein the feed section directs the fluid to the sensor tube, and wherein the return section directs the fluid from the sensor tube to the outlet.

8. The system of claim 1, wherein the thermal tube sensor housing comprises a housing cavity within which the first inboard temperature sensor, the second inboard temperature sensor, and the heater reside.

9. The system of claim 8, wherein the housing cavity further includes an insulator for reducing heat leaking from the housing cavity.

10. The system of claim 8, wherein the thermal tube sensor housing further comprises a sealable opening for receiving insulation into the housing cavity.

11. The system of claim 8, further comprising a cover plate that that covers at least a portion of the housing cavity.

12. The system of claim 1, wherein the first inboard temperature sensor comprises a temperature-sensitive resistance coil.

13. The system of claim 1, wherein the first inboard temperature sensor detects a temperature of the fluid prior to being heated by the heater and wherein the second inboard temperature sensor detects the temperature of the fluid after being heated by the heater.

14. The system of claim 1, further comprising a sensor adapter that is coupled to the flow body, wherein the sensor adapter receives a temperature sensor and a pressure sensor.

15. The system of claim 1, wherein the flow body comprises at least one of the following: a flow interface, a high flow plate, a flow element, a top plate, and a flow gasket.

16. The system of claim 1, wherein the sensor tube further comprises an upper straight portion, a first curved portion and a second curved portion, which are coupled to a first angled portion and a second angled portion, wherein the first curved portion creates a substantially acute angle between the upper straight portion and the first angled portion, and wherein the second angled portion creates a substantially acute angle between the upper straight portion and the second angled portion, such that the first angled portion and the second angled portion provide the cross position.

17. The system of claim 1, wherein the first inboard temperature sensor and the second inboard temperature sensor include a plurality of respective thermistors for detecting temperature.

18. A flow meter for detecting flow of a fluid, comprising a flow body, a thermal tube sensor housing, and a computing device, wherein:
   the flow body comprises an inlet for receiving the fluid and an outlet for expelling the fluid;
   the thermal tube sensor housing comprises a sensor tube that comprises a first connection portion, and a second connection portion;
   the sensor tube is configured with a cross position, where the cross position includes a first portion of the sensor tube crossing paths with a second portion of the sensor tube, thereby reducing a thermo-siphoning effect;
   the thermal tube sensor housing comprises a first inboard temperature sensor, a second inboard temperature sensor, a first outboard temperature sensor, a second outboard temperature sensor, and a heater that are coupled to the sensor tube,
   the fluid flows from the first outboard sensor to the first inboard sensor, to the heater, to the second inboard sensor, and to the second outboard sensor;
   a flow rate is determined based on a change in temperature of the fluid detected by the first inboard temperature sensor, the second inboard temperature sensor, the first outboard temperature sensor, and the second outboard temperature sensor; and
   data related to the flow rate is output for display.

19. A thermal tube sensor housing for detecting flow of a fluid, comprising a sensor tube, a first sensor bridge, a second sensor bridge, and a heater, wherein:
   the first sensor bridge comprises a first inboard temperature sensor and a second inboard temperature sensor,
   the second sensor bridge comprises a first outboard temperature sensor and a second outboard temperature sensor;

the first sensor bridge, the second sensor bridge, and the heater are coupled to the sensor tube such that the fluid flows from the first outboard sensor to the first inboard sensor, to the heater, to the second inboard sensor, and to the second outboard sensor;

the sensor tube is configured with a cross position, where the cross position includes a first portion of the sensor tube crossing paths with a second portion of the sensor tube, thereby reducing a thermo-siphoning effect when the heater imparts thermal energy into the sensor tube;

a flow rate is determined based on a change in temperature of the fluid detected by the first inboard temperature sensor, the second inboard temperature sensor, the first outboard temperature sensor, and the second outboard temperature sensor; and data related to the flow rate is output for display.

* * * * *